(12) United States Patent
Kasashima et al.

(10) Patent No.: US 6,168,407 B1
(45) Date of Patent: Jan. 2, 2001

(54) GOLF BALL MOLD

(75) Inventors: Atsuki Kasashima; Hirotaka Shimosaka; Keisuke Ihara, all of Chichibu (JP)

(73) Assignee: Bridgestone Sports Co., Ltd., Tokyo (JP)

( * ) Notice: Under 35 U.S.C. 154(b), the term of this patent shall be extended for 0 days.

(21) Appl. No.: 09/168,084

(22) Filed: Oct. 8, 1998

(30) Foreign Application Priority Data

Oct. 8, 1997 (JP) .................................................... 9-291676

(51) Int. Cl.$^7$ ...................................................... B29C 45/14
(52) U.S. Cl. ........................ 425/116; 264/279.1; 425/120; 425/573
(58) Field of Search .................................... 425/116, 120, 425/573; 264/279.1

(56) References Cited

U.S. PATENT DOCUMENTS 5,407,341 * 4/1995 Endo et al. ............................ 425/573
5,824,258 * 10/1998 Yamaguchi ........................... 425/116
5,874,038 * 2/1999 Kasashima et al. .................. 425/573

FOREIGN PATENT DOCUMENTS 5-84329 * 4/1993 (JP).
7-178199 * 7/1995 (JP).

* cited by examiner

Primary Examiner—Robert Davis
(74) Attorney, Agent, or Firm—Sughrue, Mion, Zinn, Macpeak & Seas, PLLC

(57) ABSTRACT

A golf ball mold includes a pair of mold sections which are removably mated along a parting line to define a spherical cavity by their concave surfaces which are provided with a plurality of dimple-forming projections. Some dimple-forming projections are located across the parting line, and molding material injecting gates or fin-forming pits are located near the respective projections. After a seamless golf ball having dimples on the parting line Is molded, any abrasion of the dimples on the parting line can be effectively avoided in the subsequent step of grinding off the fins and burrs.

11 Claims, 4 Drawing Sheets

GOLF BALL MOLD

BACKGROUND OF THE INVENTION

1. Field of the Invention

This invention relates to a golf ball mold adapted to mold a golf ball having dimples on the parting line to effectively avoid any abrasion of the dimples on the parting line when fins and burrs formed at or near the parting line are ground away. The present invention also relates to a golf ball prepared using the mold.

2. Related Art

As is well known in the art, golf balls are generally molded using a mold comprising a pair of mold sections. The mold sections are removably mated to define a spherical cavity by their concave surfaces which are provided with a plurality of dimple-forming projections. A parting line between the mold sections is located substantially at the equator of the cavity.

In the case of injection molding, about eight gates are equidistantly arranged along the parting line of the mold for injecting a cover stock (or resin material) into the cavity. On the ball molded by injecting the cover stock, those portions of the cover stock which have cured in the gates are left as fins projecting from the ball surface and additionally, fine burrs are formed at the parting line. In the case of heat compression molding, extra cover stock oozes out along the parting line to form an annular fin like Saturn's ring.

As a consequence, especially in the case of injection molding, the fins are previously cut to a predetermined length or height before grinding is effected along the parting line to abrade away the fins and burrs. The grinding operation is generally carried out using a grinding apparatus as shown in FIG. 7. Referring to FIG. 7, a ball G having fins 16 (only two shown) at the horizontal parting line P is held between a support 22 and a holder 24 such that the ball G is rotatable about a vertical axis 26 passing the north and south poles of the ball. A grinding tool 15 is equipped with an abrasive bar 14 having at the tip a concave working face 14a shaped in conformity to the curved surface of the ball G. The grinding tool 15 is advanced toward the parting line position P of the ball rotating in a direction of arrow 28 and toward the center of the ball G until the face 14a comes in contact with the fins 16. As shown in FIG. 8, there is a likelihood that the working face 14a of the abrasive bar 14 come in contact with the edge of a dimple 13. If desired, a pair of grinding tools may be disposed on opposite sides of the ball though not shown.

In the prior art, due to the necessity for such grinding, golf balls are conventionally designed such that no dimples are arranged on the parting line, that is, an endless land strip is left along the parting line. The golf ball having an endless land strip (that is, a great circle across which no dimples lie) along the parting line, however, has the problem that its flight performance is inferior because the dimple arrangement lacks some uniformity owing to certain limits imposed on the dimple arrangement.

To overcome this problem, a variety of golf balls have been proposed in which dimples are also disposed on the parting line (coincident with the ball's equator). These golf balls which are generally known as seamless golf balls have a high degree of freedom of dimple arrangement, permitting dimples to be arranged on the ball surface uniformly and at a high population and thus providing superior flight performance.

The seamless golf balls, however, have the problem that when fins and burrs on the parting line are ground away, dimples nearby are also ground especially at the edge thereof (see FIG. 8). As a result, these dimples become shallow, naturally contributing to disturbance against flight performance.

SUMMARY OF THE INVENTION

An object of the present invention is to provide a golf ball mold adapted to mold a golf ball having dimples on the parting line so as to effectively avoid any abrasion of the dimples on the parting line when fins and burrs formed at or near the parting line are ground away at the end of molding. Another object of the present invention is to provide such a golf ball prepared using the mold.

The present invention is directed at a golf ball mold comprising a pair of mold sections which are removably mated to define a spherical cavity by their concave surfaces. The concave surfaces are provided with a plurality of dimple-forming projections. A parting line between the mold sections is located substantially at the equator of the cavity. According to the invention, at least one of the dimple-forming projections is located across the parting line, and a molding material injecting gate or a fin-forming pit is located near the at least one projection. Preferably, the gate or the pit is located across the parting line. Also preferably, a pair of gates or pits are spaced apart within 5 mm from the edge of the at least one projection located across the parting line such that the projection is interposed between the pair of gates or pits.

When a molding material is molded in the mold, there is obtained a golf ball having dimples disposed at the parting line and projecting fins or burrs located near the dimples. When the ball is ground by a grinding tool as shown in FIG. 7, the working face of the grinding tool comes in abutment against the projecting fins to be ground away. This effectively avoids the grinding tool from abutting against portions other than the projecting fins to abrade the dimples on the parting line, particularly at the edge thereof. The projecting fins and burrs are cleanly ground away without leaving residues. The dimples are prevented from being abraded and becoming shallow.

According to the invention, after a seamless golf ball having dimples on the parting line is molded, any abrasion of the dimples on the parting line can be effectively avoided during subsequent grinding operation. Then the ball can take full advantage of the dimple effect. In other words, the advantages of the seamless golf ball are maintained in that the ball has a high degree of freedom of dimple arrangement, permitting dimples to be arranged on the ball surface uniformly and at a high population and thus ensuring superior flight performance.

DETAILED DESCRIPTION OF THE INVENTION

Figure 1:
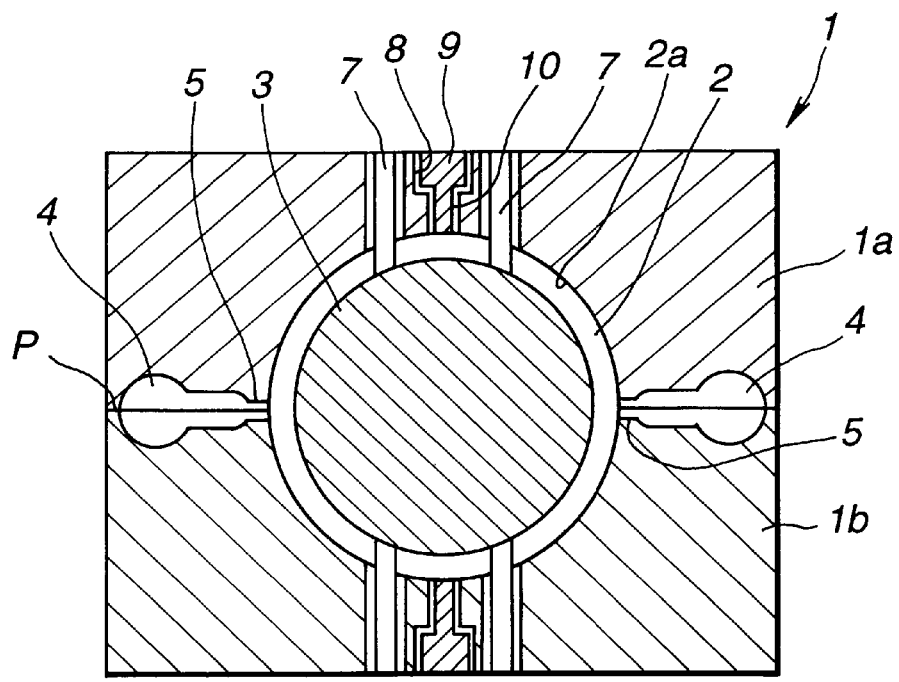
FIG. 1 is an elevational cross-sectional view of a golf ball mold according to one embodiment of the invention.
Figure 2:
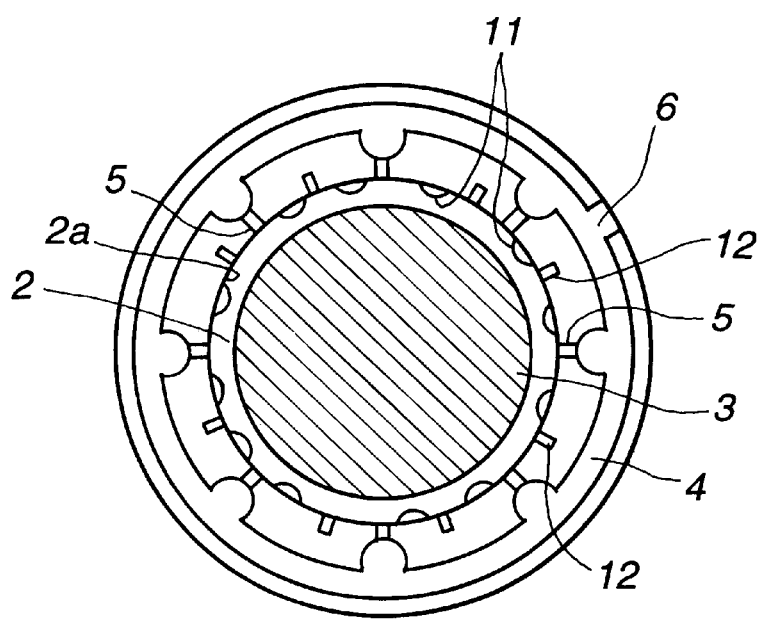
FIG. 2 is a plan view of one mold section of the mold of FIG. 1.

Referring to FIGS. 1 and 2, the golf ball mold according to one embodiment of the invention is described. FIG. 1 is an elevational cross-sectional view of a golf ball injection mold consisting essentially of upper and lower mold sections according to one embodiment of the invention. FIG. 2 is a plan view of the upper or lower mold section of the mold of FIG. 1 as viewed from above the parting plane.

The mold 1 includes a pair of upper and lower mold sections 1a and 1b which are removably mated to define a spherical cavity 2 by their concave surfaces 2a. A parting line or plane P between the mold sections is located substantially at the equator of the cavity 2. Since the upper and lower mold sections 1a and 1b are removably mated to define the spherical cavity 2 therein, a preformed core 3 can be placed at the center of the cavity 2. A plurality of retractable support pins 7 are provided near the opposite poles of the cavity for supporting the core 3 in place. In FIG. 1, four support pins 7 are provided near each pole, totaling to eight support pins. The mold 1 is also provided with an annular runner 4 surrounding the cavity 2 along or near its equator. A plurality of (preferably four to twelve) gates 5 are disposed at equal or unequal spacings along the inner circumference of the annular runner 4. The gates 5 are at one end in fluid communication with the runner 4 and at the other end open to the cavity 2 as shown in FIG. 2 for injecting a molding material from the runner 4 into the cavity 2. In the illustrated embodiment, eight gates 5 are disposed at equal spacings along the parting line P. The gates usually have an inner diameter of about 1 mm.

In FIGS. 1 and 2, a main runner 6 provides fluid communication between the annular runner 4 and an injection molding machine (not shown). Vent holes 8 are drilled in the mold, and pins 9 are received in the holes 8 to define degassing gaps 10 therebetween, permitting gases and volatiles generated during molding to escape to the outside through the gaps 10.

The concave surfaces 2a of the mold sections defining the cavity 2 are provided with a negative dimple pattern consisting of a plurality of projections for indenting dimples in the cover, referred to as dimple-forming projections (though not shown in FIG. 1). According to the invention, at least one dimple-forming projection 11, preferably four to twenty dimple-forming projections 11 are located across the parting line P. In the illustrated embodiment of FIG. 2, twelve dimple-forming projections 11 are located across the parting line P.

These dimple-forming projections 11 on the parting line P are completed when the upper and lower mold sections 1a and 1b are joined along the parting line P. It is only required that the projection lie across the parting line, and it is not necessary that the parting line pass the center of the projection to divide the projection into two equal halves.

In the mold of the invention wherein at least one dimple-forming projection 11 is located across the parting line P, a molding material injecting gate 5 or a fin-forming pit 12 is located near that projection 11 on the parting line P.

Figure 3:
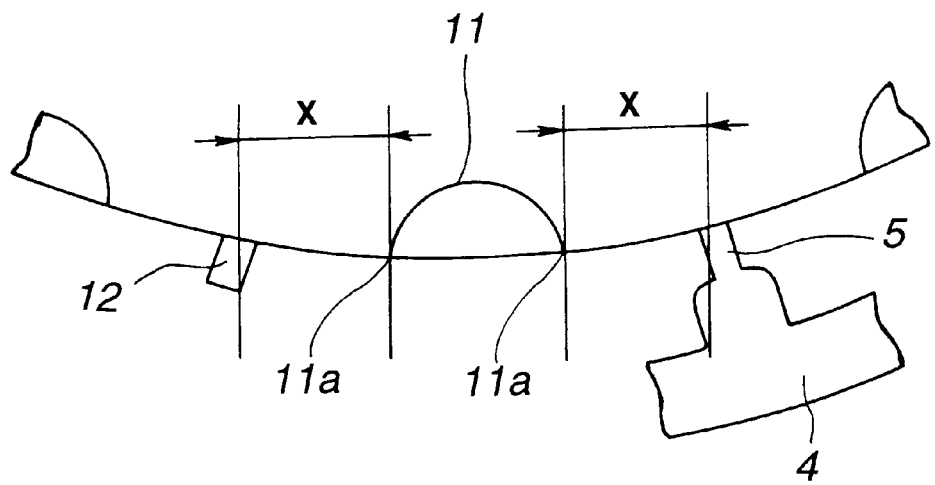
FIG. 3 is an enlarged diagram of a portion of the mold near the parting line.

Preferably, as shown in FIGS. 2 and 3, the gates 5 and the pits 12 are disposed so that the dimple-forming projection 11 on the parting line P is interposed therebetween. More preferably, a pair of gates or pits are disposed on the parting line such that the dimple-forming projection is interposed between the pair of gates or pits. In the illustrated embodiment, one gate 5 and one pit 12 are disposed on the parting line such that the dimple-forming projection 11 is interposed therebetween. Of course, the projection may be interposed between a pair of gates or between a pair of pits. The pits 12 function during molding operation such that the molding material enters the pits 12 and cures therein to form projecting fins similar to the projecting fins or burrs of molding material cured in the gates. In consideration of the efficiency of subsequent grinding step, the pits 12 are preferably dimensioned so as to form fins having a diameter of about 1 mm and a height of about 1 mm similar to the dimensions of the projecting fins of cured molding material in the gates.

As shown in FIG. 3, the gates 5 or pits 12 are preferably spaced apart from the respective dimple-forming projections 11 such that the distance X between the edge 11a of the dimple-forming projection 11 and the gate 5 or pit 12 is not greater than 5 mm, more preferably not greater than 3 mm, most preferably substantially equal to 0 mm. If the distance X is greater than 5 mm, there is a likelihood that during the step of grinding a golf ball as molded, the abrasive tool can contact against the ball surface other than the fins to be abraded away. If such contact occurs, the dimples, especially at their edge, can be abraded, resulting in shallow dimples.

Although the injection mold has been described in the illustrated embodiment, the present invention is also applicable to compression molding molds. Since no gates are needed in the compression mold, fin-forming pits are disposed at the positions where the gates are disposed in the illustrated embodiment.

With the above-described construction, the mold of the present invention permits a seamless golf ball having dimples on the parting line to be molded in such a manner as to effectively avoid any abrasion of the dimples on the parting line during grinding of the golf ball as molded.

The method of molding golf balls using the mold of the invention is not particularly limited and conventional molding methods may be employed. For example, when a cover is formed around a core using the injection mold shown in FIGS. 1 and 2, the core 3 is held in place in the cavity 2 defined between the upper and lower mold sections 1a and 1b joined along the parting line. A cover stock is injected from an injection molding machine (not shown) into the space between the core 3 and the cavity surface 2a through the main runner 6, annular runner 4 and gates 5 (which are open to the cavity at the parting line P). Immediately before or at the same time as the completion of injection, the support pins 7 are withdrawn to be flush with the cavity surface 2a. The cover is formed around the core in this way. The cover stock used herein may be any of thermoplastic resin compounds commonly used as conventional golf ball covers.

Figure 4:
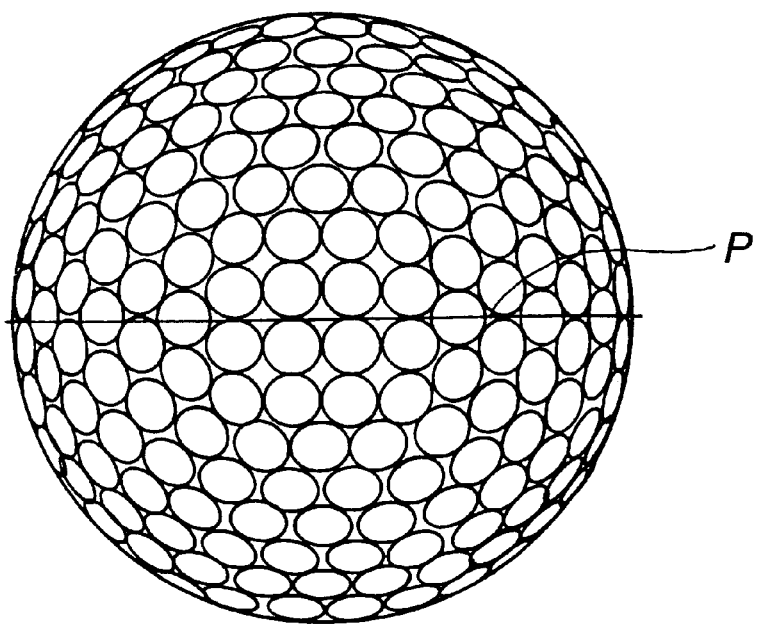
FIG. 4 is an elevational view of a golf ball prepared according to the invention.

The golf ball which is molded in this way and taken out of the mold is a seamless golf ball which has dimples on the equator (coincident with the parting line of the mold) fins and burrs formed near the dimples on the equator and corresponding to the gates and pits. One exemplary golf ball obtained using the mold of the invention is shown in FIG. 4.

Figure 7:
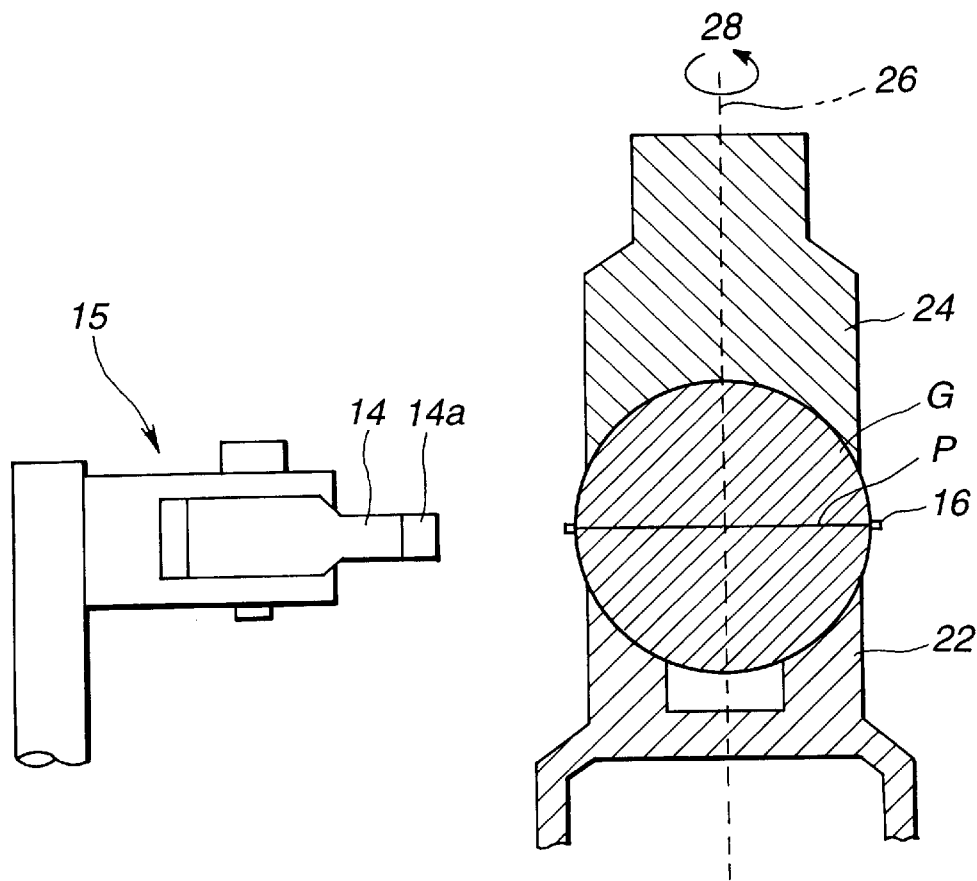
FIG. 7 illustrates how to grind a ball by grinding means.

After molding, the golf ball is polished by a grinding tool as shown at 15 in FIG. 7 whereby the fins and burrs formed at or near the equator are abraded away.

Figure 5:
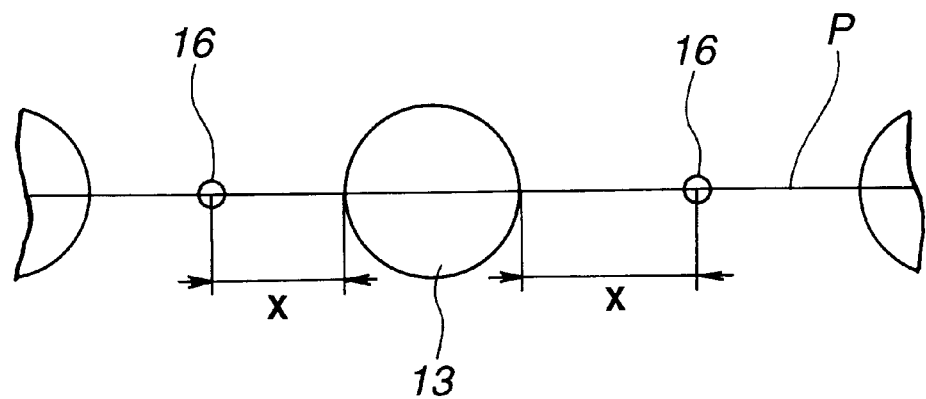
FIG. 5 is an enlarged diagram of a portion of the ball near the equator.
Figure 6:
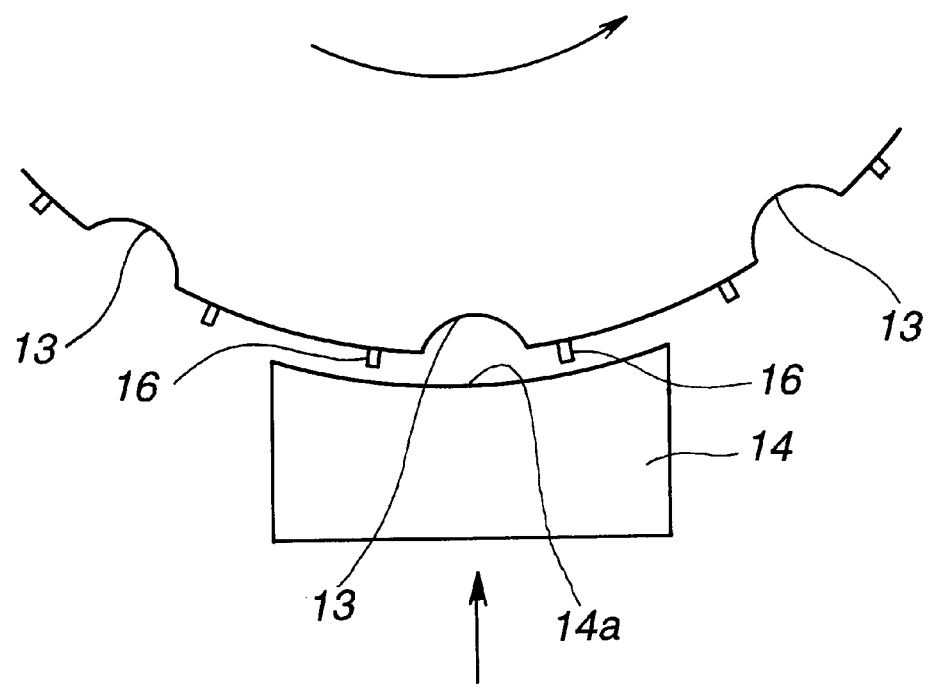
FIG. 6 illustrates the grinding of fins on the ball according to the invention.
Figure 8:
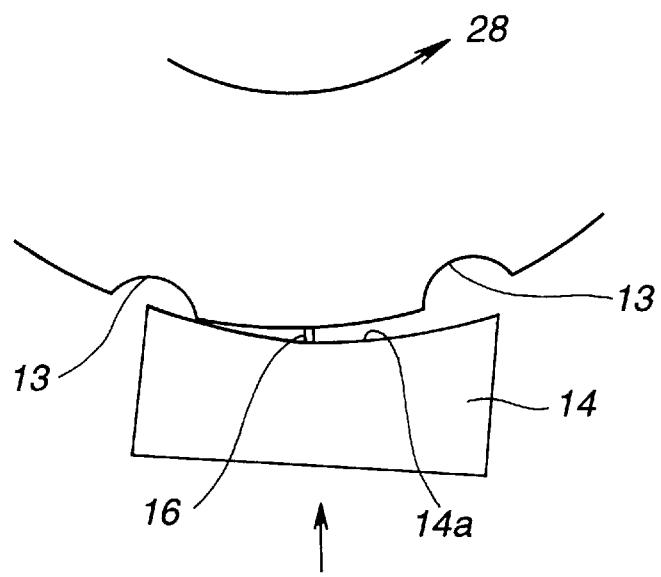
FIG. 8 illustrates the grinding of a ball surface in the prior art.

On the golf ball as molded, the fins 16 have been formed near the dimple 13 at the equator or parting line P as shown in FIG. 5, and more preferably, a pair of fins 16 have been formed at a predetermined spacing X from the dimple 13 to a substantially equal height of about 1 mm. The fins are abraded away optionally after the fins are cut to a height of about 0.2 mm by a suitable cutting means. Due to the presence of fins near the dimple, when the concave working face 14a of the abrasive bar 14 is advanced toward the ball during grinding operation, the working face 14a comes in contact with more than one fin 16, as shown in FIG. 6, so that the working face 14a may come in parallel close abutment with the ball surface without being slanted relative to the ball surface. Then only the fins and burrs are cleanly abraded away without leaving residues. If the fins 16 are located far from the dimple 13, the working face 14a can contact the ball surface at an angle as shown in FIG. 8, that is, the working face 14a can contact the edge of the dimple 13. While grinding operation with the abrasive bar 14 driven under advancing pressure is continued until the fins 16 are abraded away, the dimples 13 at the edge can also be abraded away to a substantial extent. In contrast, such undesirable abrasion is avoided where the fins 16 are located near the dimples 13, and especially where a pair of fins 16 are closely located on opposite sides of each dimple 13 as shown in FIG. 6.

The golf ball which is molded and polished in this way is a seamless golf ball which has dimples on the equator (coincident with the parting line of the mold). A concomitant high degree of freedom of dimple arrangement permits dimples to be arranged on the ball surface uniformly and at a high population, ensuring superior flight performance. Since the dimples located near the equator are not abraded at all during the grinding step subsequent to the molding step, the advantages of the seamless golf ball are maintained.

Although the mold of the invention is effective for forming the cover around the core, the invention is not limited thereto. The mold of the invention is also applicable to the manufacture of one-piece golf balls. The structure of the golf ball is not critical, and the invention is applicable to either wound golf balls or solid golf balls.

Japanese Patent Application No. 9-291676, Oct. 8, 1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. In a golf ball mold comprising a pair of mold sections which are removably mated to define a spherical cavity having an equator by their concave surfaces, the concave surfaces being provided with a plurality of dimple-forming projections, a parting line between the mold sections being located substantially at the cavity equator, and wherein at least one of the dimple-forming projections is located across the parting line, and a molding material injecting gate or a fin-forming pit is located near said at least one projection to avoid abrasion of at least one dimple formed by said at least one projection on the parting line during grinding a burr formed by the gate or a fin formed by the fin-forming pit of the golf ball as molded.

2. The mold of claim 1 wherein said gate or said pit is located across the parting line.

3. In a golf ball mold comprising a pair of mold sections which are removably mated to define a spherical cavity having an equator by their concave surfaces, the concave surfaces being provided with a plurality of dimple-forming projections, a parting line between the mold sections being located substantially at the cavity equator, and wherein at least one of the dimple-forming projections is located across the parting line and a pair of molding material injecting gates or fin-forming pits are spaced apart within 5 mm from the edge of said at least one projection located across the parting line such that said projection is interposed between the pair of gates or pits.

4. The mold of claim 1 wherein said molding material injecting gate or said fin-forming pit is spaced apart within 5 mm from the edge of said at least one projection located across the parting line.

5. The mold of claim 1 wherein said molding material injecting gate or said fin-forming pit is spaced apart within 3 mm from the edge of said at least one projection located across the parting line.

6. The mold of claim 1 wherein said molding material injecting gate or said fin-forming pit is spaced a distance of substantially 0 mm from the edge of said at least one projection located across the parting line.

7. The mold of claim 1 wherein a pair of gates or pits are disposed on the parting line such that the dimple-forming projection is interposed between the pair of gates or pits.

8. The mold of claim 1 wherein one gate and one pit are disposed on the parting line such that the dimple-forming projection is interposed therebetween.

9. The mold of claim 1 wherein said pits are dimensioned to form fins having a diameter of 1 mm and a height of 1 mm.

10. In a golf ball mold comprising a pair of mold sections which are removably mated to define a spherical cavity having an equator by their concave surfaces, the concave surfaces being provided with a plurality of dimple-forming projections, a parting line between the mold sections being located substantially at the cavity equator, and wherein a plurality of molding material injecting gates or a plurality of fin-forming pits are located across the parting line, and at least one of the dimple-forming projections is located at a position within about 5 mm from one of said gates or pins.

11. The mold of claim 10, wherein said dimple-forming projection is located across the parting line.

* * * * *